Patented Nov. 21, 1944

2,363,069

UNITED STATES PATENT OFFICE 2,363,069

ANTHRAQUINONE DYES FOR ANIMAL AND RELATED FIBERS

Henry R. Lee, Pitman, N. J., and Charles A. Young, Wilmington, Del., assignors to E. I. du Pont de Nemours & Company, Wilmington, Del., a corporation of Delaware No Drawing. Application May 23, 1942, Serial No. 444,274

6 Claims. (Cl. 260—368)

This invention relates to the preparation of new dyes for animal and related fibers and more particularly the preparation of new anthraquinone wool dyes which dye in desirable gray and taupe to brown shades having outstanding fastness properties.

While in the field of dyes for wool, silk and related fibers a wide range of colors have been developed and are available for use today to produce a wide variety of shades there is still an effort being made to produce colors in this class with improved dyeing and fastness properties as well as a wider variety of shades. Ease of application to give the shade desired, compatibility of colors in mixtures, the levelness with which the dye is absorbed by the fiber, its fastness with respect to the multifold conditions to which the particular fabric must be subjected, the affinity of a particular color for the fiber, especially important when the color must be used in mixtures, are all qualities that must be taken into consideration in developing new colors for the market today. It is recognized that many of the commercial dyes are lamentably deficient in some of their dyeing or fastness properties, but until more desirable colors can be produced, these deficient colors must still be employed if a shade requiring such a color is in demand.

In searching for faster colors in the anthraquinone wool color class certain simple substituted-1,1'-dianthrimide sulfonic acids have been produced which show good fastness properties, but these are of a limited range in shade, dyeing wool and related fibers in bluish gray to lavender gray shades. Since dyes of equal fastness properties and similar dyeing characteristics with which to shade these colors are not available, these colors are limited in their usefulness. Furthermore it is desirable in any class to have a variety of shades so that relatively little mixing, except for shading purposes is required. In view of the wide use of neutral gray, taupe and brown shades in upholstering material, rugs, etc., there is a great demand for colors for wool in this color range which have good application and exceptional fastness properties, particularly to light.

It is therefore an object of this invention to provide new dyes for wool and related fibers, in the anthraquinone series, which dye in neutral gray and taupe to brown shades, which have good application and exceptional fastness properties, particularly to light. It is a further object of the invention to provide new colors for wool, silk and nylon in the 1,1'-dianthrimide sulfonic acid class which may be used with known colors of that class having similar application characteristics whereby the usefulness of that class of fast colors may be enlarged in the dyeing of animal and related fibers.

We have found that where 1,1'-dianthrimides which carry at least 1 free amino group in the alpha position para to the imino-linkage are subjected to acylation, preferably with an aliphatic acylating agent, then sulfonated to make the product water soluble and the resulting acylaminodianthrimide sulfonic acid derivative then subjected to the action of a reducing agent in sulfuric acid, new and valuable acid wool dyes are produced which dye in desirable gray and taupe to brown shades of good application and excellent fastness properties.

The new dyes may be produced from 4-amino-1,1'-dianthrimide, 4,4'-diamino-1,1'-dianthrimide and 4-amino-4'-hydroxy-1,1'-dianthrimide and their halogenation and simple substitution derivatives, by acylating the 4-amino-1,1'-dianthrimide compound in concentrated sulfuric acid of from 98% to 35% oleum, and at temperatures of from 20° to 100° C., then adding sufficient oleum to bring the solution to from 15% to 35% oleum to effect sulfonation of the product at temperatures of from 40° C. to 100° C. When sulfonation is complete the mass is cooled and the acid concentration is brought to from 85% to 100% with water or dilute acid, a small amount of reducing agent is then added and the mass is stirred at temperatures of from 0° to 100° C., prefarably at 20 to 40° C., until no further change in the color of the solution occurs. The water soluble dyes thus produced may be isolated by any of the methods usually employed in isolating water soluble anthraquinone sulfonic acids, such as by drowning the mass in an aqueous solution of sodium chloride, filtering, washing the cake with salt solution and drying. Where the acylation is carried out in oleum at the higher temperatures, sulfonation may be effected simultaneously therewith. In acylating the aminodianthrimide the acid halides, acid anhydrides or the anhydrous acids may be employed.

The following examples are given to illustrate the invention. The parts used are by weight.

Example 1

To a solution of 25 parts of 4,4'-diamino-1,1'-dianthrimide in 150 parts of 100% sulfuric acid is added slowly at 25–30° C. 10 parts of acetyl chloride. The resulting solution is stirred at 50–55° C. for two hours. 150 parts of 63–65% oleum is then added, and the mass stirred at 90–95° C. for one-half hour or until a test sample poured into water (about two drops of the mass in 10 cc. water) completely dissolves on heating, forming a reddish-blue solution. When the sulfonation is complete, the reaction mixture is cooled and 22 parts of water is slowly added at 20–50° C. One part of copper powder is then added, and the mixture stirred at 20–30° C. for 10–15 hours, until the color of the sulfuric acid solution has changed from green to brown, and the product forms a brown solution in water. The product is isolated by pouring the reaction mass into a cooled 20% sodium chloride solution, filtering off the precipitated color, washing with more salt solution and finally drying. The new product dyes wool in strong taupe shades having excellent fastness properties.

In place of acetyl chloride employed in this preparation there may be used equivalent amounts of acetic anhydride or glacial acetic acid.

Instead of copper powder there may be employed ferrous sulfate or iron, aluminum or zinc powder as the reducing agent.

*Example 2*

6.5 parts of acetic anhydride is added slowly at 25–30° C. to a solution of 25 parts of 4,4'-diamino-1,1'-dianthrimide in 300 parts of 31% oleum. The resulting mixture is stirred at 45–55° C. for two hours, at the end of which time the product is completely soluble in hot water. Then the mass is stirred at 90–95° C. for one-half hour, after which it is cooled and 35 parts of water is added at 20–50° C. After cooling to 30° C., 1.5 parts of copper powder is added, and the mass stirred at 20–30° C. for 15 hours. The reaction mass is drowned in sodium chloride solution, and the crude color is filtered off, washed and dried. The product is similar to that obtained in Example 1.

*Example 3*

To a solution of 15 parts of 4-amino-1,1'-dianthrimide in 90 parts of 100% sulfuric acid is added 6 parts of acetyl chloride, and the mass is stirred at 50–55° C. for two hours. 90 parts of 63–65% oleum is then added, and the resulting solution stirred at 90–100° C. for one-half hour. The mass is cooled and 13 parts of water added. The product at this point forms a brown solution with concentrated sulfuric acid and dyes wool brownish violet shades. To the cooled and diluted sulfonation mass is added 0.9 part of copper powder and the mixture stirred for fifteen hours. The product, which is isolated as described in Example 1, imparts an olive color to concentrated sulfuric acid and dyes wool attractive brown shades. If aluminum powder is added to the diluted sulfonation mass instead of copper powder, a product is obtained which dyes wool somewhat greener shades.

*Example 4*

25 parts of 4-amino-4'-hydroxy-1,1'-dianthrimide is dissolved in 150 parts of 100% sulfuric acid. To this solution is added 10 parts of acetyl chloride and the mixture stirred at 45–55° C. for two hours. Then 150 parts of 65% oleum is added and mass stirred at 90–95° C. for one-half hour, or until the product is completely soluble in warm water. The sulfonated product dyes wool in grayish blue shades from a reddish blue solution. To the sulfonation mass is added 22 parts of water, and after cooling to 30° C. 1.5 parts of copper powder is added. The mixture is stirred at 20–30° C. for twelve hours and the product isolated by drowning in water, followed by the addition of sodium chloride, filtering, washing and drying. The product forms a green solution with concentrated sulfuric acid, a lavender solution with water, and dyes wool neutral gray shades. The use of aluminum in place of copper powder results in the formation of a product which dyes wool somewhat greener shades.

*Example 5*

11.8 parts of propionyl chloride is added to a solution of 25 parts of 4,4'-diamino-1,1'-dianthrimide in 150 parts of 100% sulfuric acid. The mixture is stirred at 50–55° C. for two hours. 150 parts of 65% oleum is then added, and the mass is stirred at 90–95° C. for one-half hour. At the end of this time the mass is cooled and 22 parts of water added. The product at this point forms a lavender solution in water and dyes wool lavender-gray shades. After cooling the reaction mass to 30° C., 1.5 parts of copper powder is added, and the mixture stirred at 20–30° C. for sixteen hours. The product, which is isolated from the reaction mass according to the method described in Example 1, forms a brown solution with water and dyes wool in attractive taupe shades.

*Example 6*

To a solution of 25 parts of 4,4'-diamino-1,1'-dianthrimide in 150 parts of 100% sulfuric acid is added 17.9 parts of benzoyl chloride and the mixture is stirred at 50–55° C. for two hours. Then 150 parts of 63.5% oleum is added and the mass stirred at 90–95° C. for one-half hour, after which the charge is cooled and 22 parts of water added. The product at this point forms a green solution with concentrated sulfuric acid, a violet solution with water, and dyes wool in reddish gray shades. On addition of 1.5 parts of copper powder and stirring at 20–30° C. for sixteen hours, the color of the sulfuric acid solution becomes brown, the product forms an olive-gray solution with water and dyes wool in olive-gray shades. The new color is isolated as described in Example 1.

In the above examples the aminodianthrimide may be acylated in organic solvents by the known methods and the resulting acylaminodianthrimide, after isolation, may be sulfonated in oleum and subjected to the action of the reducing agent in sulfuric acid as described in the examples. Acylation in sulfuric acid, however, is preferred for by this process isolation of the acyldianthrimide is made unnecessary.

It is of course understood that other acylating agents than those mentioned in the specific examples are contemplated as coming within the scope of the present invention, those given in the specific examples being used merely to exemplify the invention. The higher homologues and substitution derivatives of both the aliphatic and aromatic acylating agents may be employed such as for example isobutyric anhydride, caproyl chloride, ortho-chloro-benzoyl chloride, para-anisic anhydride, cuminic anhydride, and meta-carboxy-benzene sulfonyl chloride.

The amount of sulfuric acid or oleum employed should be sufficient to completely dissolve the starting material and the final oleum concentration should be such that sulfonation will be effected at temperatures preferably below 150° C.

In effecting conversion of the sulfonated acylaminodianthrimides to the new colors of this invention reducing agents such as metals and metal salts which have a reducing action in concentrated sulfuric acid may be employed, such as for example copper, aluminum, zinc, iron and reducing salts of such metals as for example, ferrous sulfate and stannous chloride. The temperature at which the conversion of the dyes by means of the reducing agents in sulfuric acid may be carried out may vary from 0 to 100° C., the time required to effect conversion varying with the temperature at which the reaction is carried out.

Although an excess of acylating agent is employed over that theoretically required to completely acylate the amino-dianthrimide, it has been found that the resulting product is not completely acylated. Some deacylation also unquestionably takes place during the sulfonation reaction particularly at the higher temperatures. During the treatment of the acylaminodianthrimide with the reducing agent in sulfuric acid where the reaction is carried out without isolation of the product or removal of the excess acylating agent present it is possible that some acylation takes place, but even then the final product is not completely acylated. It has also been impossible to determine the exact molecular structure of the product resulting from the reaction of the reducing agent in sulfuric acid on the acylated-aminodianthrimide and while it is believed that a ring closure of some type is effected, because of the radical change in the dyeing properties of the resulting products, it is impossible to definitely state the nature of this ring closure or condensation.

We claim:

1. The dyestuffs which are obtained by acylating a 4-amino-1,1'-dianthrimide, sulfonating the resulting product in oleum and subjecting the resulting acylated amino-1,1'-dianthrimide sulfonic acid to the action of a reducing agent in sulfuric acid at temperatures of from 0 to 100° C., which dyestuffs dye wool and related fibers in gray and taupe to brown shades exhibiting excellent fastness properties.

2. The dyestuffs which are obtained by acylating a 4-amino-1,1'-dianthrimide, which carries in the 4'-position a substituent of the group consisting of H, OH and NH—2, sulfonating the resulting product in oleum and subjecting the resulting acylated amino-1,1'-dianthrimide sulfonic acid to the action of a reducing agent in sulfuric acid at temperatures of from 0 to 100° C., which dyestuffs dye wool and related fibers in gray and taupe to brown shades exhibiting excellent fastness properties.

3. The dyestuffs which are obtained by acylating 4,4'-diamino-1,1'-dianthrimide, sulfonating the resulting product and subjecting the acylated 4,4'-diamino-1,1'-dianthrimide sulfonic acid to the action of a reducing agent in sulfuric acid, which products dye wool and related fibers in gray and taupe to brown shades exhibiting excellent fastness properties.

4. The dyestuffs which are obtained by subjecting 4,4'-diamino-1,1'-dianthrimide to acylation with an aliphatic acylating agent, sulfonating the resulting product and subjecting the acylated diaminodianthrimide sulfonic acid to the action of a reducing agent in sulfuric acid, which dyestuffs dye wool and related fibers in taupe shades of excellent fastness properties.

5. The dyestuff which is obtained by subjecting 4,4'-diamino-1,1'-dianthrimide to acetylation and sulfonation and subjecting the resulting acetylated diamino-dianthrimide sulfonic acid to the reaction of a reducing agent in sulfuric acid, which dyestuff dyes wool and related fibers in taupe shades of excellent fastness properties.

6. The dyestuff which is obtained by subjecting 4-amino-4-hydroxy-1,1'-dianthrimide to acetylation and sulfonation and subjecting the resulting acetyl-amino-hydroxy-dianthrimide sulfonic acid to the action of a reducing agent in sulfuric acid, which dyestuffs dye wool and related fibers in neutral gray shades of excellent fastness properties.

HENRY R. LEE.
CHARLES A. YOUNG.